Patented Sept. 3, 1940

2,213,717

UNITED STATES PATENT OFFICE 2,213,717

ALKYL ESTERS OF 3-METHOXY-COUMARIC ACID AND PHARMACEUTICAL COMPOSITIONS CONTAINING SAME

Louis Poizat, Serezin-du-Rhone, and Joseph Lahousse, Lyon, France, assignors to Societe des Usines Chimiques Rhone-Poulenc, Paris, France, a corporation of France No Drawing. Application September 30, 1938, Serial No. 232,527

7 Claims. (Cl. 260—473)

This invention relates to a series of new and useful organic compounds, namely, the esters of 3-methoxy-coumaric acid (2-hydroxy-3-methoxy-cinnamic acid). These esters correspond to the general formula

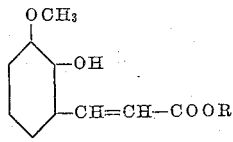

in which R designates an alkyl radical.

It is an object of this invention to provide new and useful compounds of the above general formula, as well as a process for making the same. It is a further object of this invention to provide novel medicinal preparations which have the power to protect the human skin against sunburn. Other and further important objects of this invention will appear as the description proceeds.

As far as we know, esters of the above general formula have not been described in the chemical literature. They may be obtained by starting with 8-methoxy-coumarine

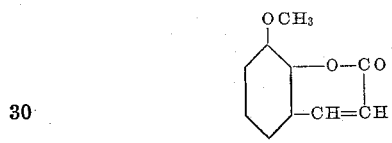

whose preparation is described by Nölting in the Annales de Chimie et de Physique, 8th series, vol. 19, page 494. This initial material is transformed into an ester of 3-methoxy-coumaric acid by reacting upon the same with an alkali-metal alcoholate whose alcoholic radical is the one which is desired in the final ester, and by treating the reaction product with a dilute acid.

By way of non-limiting examples there is described below the preparation of ethyl-3-methoxy-coumarate and butyl-3-methoxy-coumarate. The parts are by weight.

*Example 1.*—An alcoholic solution of sodium ethylate is prepared by introducing 106 parts of sodium into 1800 parts of absolute alcohol. Into this solution is run-in a solution of 352 parts of 8-methoxy-coumarine in 3600 parts of absolute alcohol. The mixture is boiled at reflux, and test samples are periodically removed, in which one determines the content of ethyl-3-methoxy-coumarate. The heating is suspended when two successive samples give the same results. The reaction mass is then run into a large excess of ice water containing 300 parts of glacial acetic acid. The crystalline precipitate which is formed is drained dry. After washing and drying there are obtained 405 parts of ethyl-3-methoxy-coumarate, which represents a yield of 91% of theory. After recrystallization from alcohol, the product possesses a solidification point of 68.5° C. If heated under an absolute pressure of 4 mm. of mercury, it begins to distill at 180° C. with decomposition.

*Example 2.*—The procedure is the same as in Example 1, except that a butyl-alcohol solution of sodium butylate is employed in place of the alcoholic solution of sodium ethylate. The butyl-3-methoxy-coumarate obtained presents a solidification point of 47.3° C.

In a similar manner other alkyl esters of 3-methoxy-coumaric acid may be prepared, by employing any desirable alkali-metal alcoholate, say, up to 5 carbon atoms, preferably in solution of the corresponding free-alcohol. For acidifying the intermediate alkali-metal compound, one may employ any convenient organic or inorganic acid, for instance, hydrochloric, sulfuric or acetic, diluted to a strength equivalent, for instance, to not more than 5% sulfuric acid.

The new esters find new and important employment as constituents in preparations designed to absorb certain solar radiations.

It is known that the solar spectrum contains a whole series of radiations which exercise a harmful action on the human skin, that is, causing erythema and sometimes even actual burns. These noxious radiations belong to the ultra-violet range. They are those whose wave length is comprised between 2930 and 3200 Å. The radiations whose wave length is above 3200 Å. have, on the contrary, a well-known beneficial action.

The esters of 3-methoxy-coumaric acid have the peculiar property of absorbing these noxious rays, and are therefore specially suited for employment as constituents of creams or oils designed for application to the skin for protecting the same against the harmful radiations of the solar spectrum. Thus, for example, a solution of ethyl-3-methoxy-coumarate absorbs in remarkable fashion the erythematous rays while letting through practically all the beneficial rays, that is, the rays of longer wave length. Moreover, ethyl-3-methoxy-coumarate presents a high solubility in animal or vegetable oils, greases, or other common bases for ointments, which fact assures good protection to the skin with but little thickening of the ointment. It is also practically insoluble in water; consequently, it does not run the risk of being removed by bathing or perspiration. Finally, it is absolutely harmless physiologically. The butyl-3-methoxy-coumarate, prepared according to Example 2, presents properties very close to those of the ethyl ester.

For illustrating the employment of the esters of 3-methoxy-coumaric acid in the preparation of "antisolars," we give below a typical formula for an oil and a typical formula for a cream:

Oil:

| | Parts |
|---|---|
| Ethyl-3-methoxy-coumarate | 5 |
| Coconut oil | 95 |
| Total | 100 |

Cream:

| | Parts |
|---|---|
| Butyl-3-methoxy-coumarate | 5 |
| Hydrogenated vegetable oil | 51 |
| Vegetable oil | 25 |
| 10% aqueous solution of methyl-cellulose of high viscosity | 19 |
| Total | 100 |

It will be understood that these formulas are merely illustrative, and that the composition of the same, apart from the ester of 3-methoxy-coumarine, may be varied within wide limits following the customary practice in the preparation of ointments of this type.

We claim:

1. An alkyl ester of 3-methoxy-coumaric acid.
2. A compound of the general formula

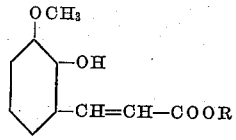

wherein R is a lower alkyl radical.

3. Ethyl-3-methoxy-coumarate.
4. Butyl-3-methoxy-coumarate.
5. A pharmaceutical preparation comprising as active ingredient an alkyl ester of 3-methoxy-courmaric acid.
6. A pharmaceutical composition of matter for the protection of human skin against sunburn, comprising as active ingredient ethyl-3-methoxy-coumarate.
7. A pharmaceutical composition of matter for the protection of human skin against sunburn, comprising as active ingredient butyl-3-methoxy-coumarate.

LOUIS POIZAT.
JOSEPH LAHOUSSE.